United States Patent [19]

Mullen

[11] Patent Number: 4,857,282
[45] Date of Patent: Aug. 15, 1989

[54] COMBUSTION OF BLACK LIQUOR

[75] Inventor: Walter T. Mullen, Burlington, Canada

[73] Assignee: Air Products and Chemicals, Inc., Allentown, Pa.

[21] Appl. No.: 143,904

[22] Filed: Jan. 13, 1988

[51] Int. Cl.⁴ .................. D21C 11/12; D21C 11/14; G22B 26/10; B01J 17/60

[52] U.S. Cl. ................. 423/207; 162/30.11; 162/31; 423/DIG. 3

[58] Field of Search .............. 423/DIG. 3, DIG. 9, 423/207; 162/30, 30.1, 30.11, 31

[56] References Cited

U.S. PATENT DOCUMENTS

| | | | |
|---|---|---|---|
| 3,761,568 | 9/1973 | Brink et al. | 423/DIG. 3 |
| 3,872,414 | 3/1975 | Rocher et al. | 162/30.11 |
| 3,920,506 | 11/1975 | Morgan | 162/31 |
| 4,048,286 | 9/1977 | Rossmailer | 423/DIG. 3 |
| 4,058,433 | 11/1977 | Fuller et al. | 162/31 |
| 4,242,177 | 12/1980 | Suzuki et al. | 162/31 |
| 4,682,985 | 7/1987 | Kohl | 462/30.11 |

OTHER PUBLICATIONS

Gans, M., Choosing Between Air and Oxygen for Chemical Process, CEP, Jan. 79, pp. 67-72.

Primary Examiner—Gary P. Straub
Attorney, Agent, or Firm—James C. Simmons; William F. Marsh

[57] ABSTRACT

A process for combusting black liquor by enriching the normal process air used in the combustion process by the addition of up to 5% oxygen.

2 Claims, 2 Drawing Sheets

COMBUSTION OF BLACK LIQUOR

FIELD OF THE INVENTION

The present invention relates to the combustion (burning) of pulp mill black liquor.

BACKGROUND OF THE INVENTION

In the Kraft process for converting wood chips into cellulose the wood chips are cooked under pressure in an aqueous alkaline solution containing $Na_2S$ whereby the cellulose is chemically separated from the other constituents of the wood chips. The spent cooking liquid is called black liquor and must be disposed of in such a way that its chemical values are recovered, usually in a recovery furnace such as a waste heat boiler (see Kirk-Othmer, Vol. 11, pages 575 and 576).

The black liquor is sprayed into the recovery furnace where water in the black liquor evaporates and the black liquor is immediately "dried" as the drops descend toward a hearth. The "dried" drops are at least partially burned and the unburned residue ultimately forms a bed of char (carbon) and a smelt, containing chemicals potentially useful in the pulping process. Any $Na_2SO_4$ in the smelt is reduced to $Na_2S$ when it contacts the char thereby regenerating a chemical required in the Kraft process cooking liquor.

At many Kraft mills, the amount of black liquor which can be fired into a recovery boiler is limited by the capacity of the recovery boiler, i.e. by the maximum amount of steam that can be produced safely. The amount of black liquor which can be fired into a recovery boiler to produce heat which is recovered as steam is also limited by the rate of deposit formation on the upper pendant heat transfer surfaces. The rate of deposit formation is determined by the impaction rate of droplets on the upper pendant heat transfer surfaces and by the physical state of the droplets. The impaction rate is a function of droplet size and the upward velocity of gases in the main furnace space. The probability of a particle attaching itself to a heat transfer surface depends on its state. When a droplet is semi-molten (i.e. tacky) it tends to condense upon contact with the cooler heat transfer surface. If the temperature of the particle entering the upper heat transfer surface is at or above that required for a semi-molten state, deposition will occur. When additional black liquor is injected into the boiler, additional air must be added, and the amount of energy released is increased. The rate of deposit formation will be increased because of the extra upward gas momentum and may increase if the temperature of the particles impacting the heat transfer surfaces rises above the tacky temperature. The maximum firing rate (i.e. capacity) of the boiler is reached when the rate of deposition is equal to the rate at which the deposit can be removed, by steam cleaning or by other means.

BRIEF SUMMARY OF THE INVENTION

Utilizing oxygen enrichment of the primary air of the combustion furnace into which black liquor is sprayed results in a process which increases the flame temperature, combustion rate of solid carbonaceous material, rate of pyrolysis, the drying rate of black liquor droplets, the heat transferred to the water conveying tubes, thus decreasing the temperature of the gases entering the upper heat transfer surfaces and the rate of deposit formation while increasing the capacity of the furnace to combust black liquor for a given size furnace.

DETAILED DESCRIPTION OF THE INVENTION

Figure 1:
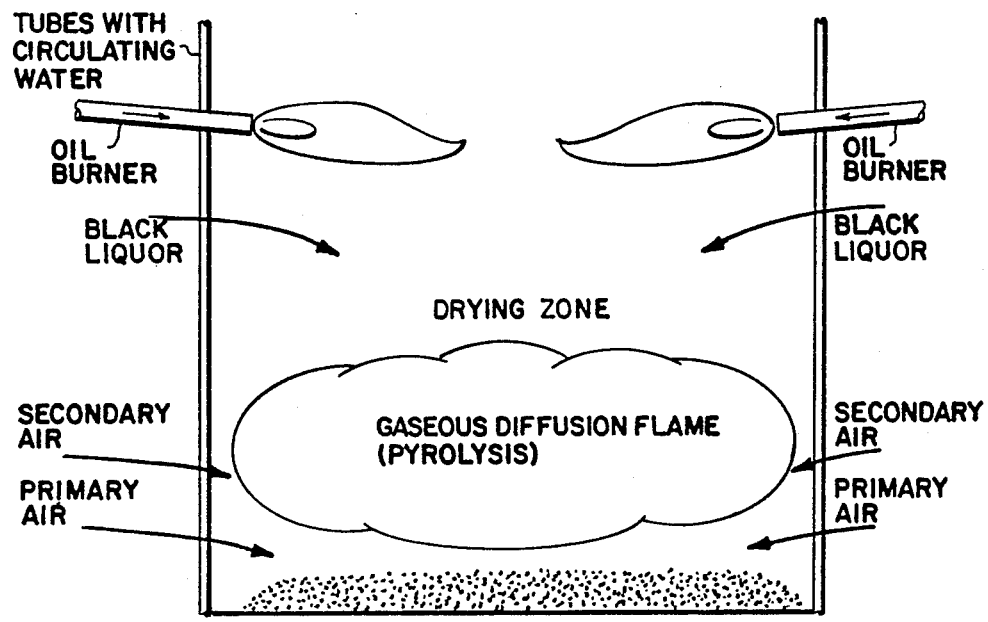
FIG. 1 is a schematic representation of an existing furnace for combusting black liquor.

The present invention relates to an increase in the recovery boiler capacity by means of oxygen enrichment of the primary air stream and of the secondary air stream by the addition of up to 5% oxygen by volume to said air streams.

The injection of oxygen into the primary air will increase the incineration rate in two ways:

1. Increase the char burning rate by raising the oxygen concentration since the char burning rate is a linear function of oxygen concentration.

2. Increase the drying rate and possibly the char burning rate by increasing the lower furnace temperature.

As previously noted, the amount of black liquor which can be burned in a recovery boiler is determined by the maximum allowable deposition rate on the upper heat transfer surfaces. The rate of deposition depends on the downward momentum of the black liquor droplet; the upward momentum of the combustion gases and the physical state of the droplet. Oxygen enrichment will permit an increase in the momentum of the black liquor particle by increasing the rate of incineration, and thus allowing an increase in particle mass. Oxygen enrichment will also provide a means of controlling the momentum of the combustion gases by changing the ratio defined as (incremental secondary air/incremental oxygen to the primary air). Oxygen enrichment will reduce the temperature of the gases entering the upper heat transfer surfaces by increasing the rate of heat transfer to the tubes conveying water in the main furnace cavity through an increase in the adiabatic flame temperature and increased heat flux in the lower furnace. The net effect is a capacity increase which cannot be achieved by any other method.

The recovery boiler in a Kraft mill performs these functions:

(a) Converts organically bound sodium and sulphur to a form suitable for reprocessing;

(b) Converts $Na_2SO_4$ to $Na_2S$;

(c) Incinerates the organic effluent (i.e. black liquor) from the Kraft process; and (d) Produces steam from the energy released from the incineration process.

The black liquor is injected into the boiler in droplet form at a specific level above the hearth of the boiler. As the droplets fall, they are dried by the hot combustion gases, and they combust with the secondary air injected into the boiler. The carbon residue left after the pyrolysis phase reaches the bottom of the furnace where it reacts with the primary air injected into this zone.

The amount of time available for these process is fixed. The amount of time required to complete the processes is a function of the rate. of drying, pyrolysis and char burning and a particular droplet size will exist such that the time available for incineration is equal to the time required.

When the mass flow rate of black liquor is increased the volume of combustion air must be increased. The particle is trying to drop while the gases produced by combustion rise. Since the cross sectional area of the boiler is constant, the velocity of the rising gases increases because of the additional volume required to combust the additional black liquor and the apparent reduction in cross sectional area caused by the increase in black liquor mass flow rate. The energy release with the combustion of additional black liquor will cause an increase in the temperature of the gases and the droplets entering the upper heat transfer section.

Some of the black liquor droplets become entrained in the rising gases and contact the heat transfer surfaces of the upper furnace. If the particles are in a molten or semi-molten state, they will solidify upon contact with the heat transfer surface (i.e. tube) and form a deposit. The rate at which this deposit forms will depend on the entrainment level and the temperature of the flue gases.

The deposits are removed by directing high pressure steam at the heat transfer surfaces. If the rate of deposition is greater than the rate of removal, the formation will build and ultimately plug the gas passaes of the boiler. When this occurs, the boiler must be shut down and cleaned. Therefore, the maximum firing rate of a recovery boiler will be the value at which the rate of deposit formation is equal to the rate of removal.

The conversion of the inorganics to the form suitable for the Kraft process is highly dependent on temperature. If the temperature in the lower section of the boiler is low, the conversion efficiency is reduced and sulfur compounds, namely $SO_2$ and $H_2S$ which are considered pollutants are produced and carried into the atmosphere by the boiler flue gases.

The rate of particle entrainment is a function of the mass of the particle and the gas velocity. The mass of the particle, and hence surface area, can be increased if the rate of drying and/or pyrolysis and/or char burning is increased.

The average gas velocity is a function of firing rate, but the rate of entrainment can be reduced by ensuring a uniform gas velocity across the boiler cross section. Previous attempts to increase the capacity of a recovery boiler involved one of the following:

(a) The removal of water from the black liquor prior to firing.

(b) Increased mixing in the pyrolysis zone to increase pyrolysis and produce uniform gas velocities.

(c) Increase the rate of char burn by supplying more air to this zone.

Each of these expedients will increase the incineration rate and thus allow an increase in particle mass, but each is of limited applicability.

Theoretically the capacity of a boiler will increase as more water is removed from the black liquor before it is fed into the boiler. Using commercial equipment available at this time the minimum amount of water attainable in the black liquor is 30% at which concentration the black liquor becomes too viscous to spray. This effectively limits the possible capacity increase by this means alone.

Gas mixing or turbulence is described by the Reynolds number (Re). The rate of pyrolysis combustion is a function of the Reynolds number and is often roughly proportional to the square root of Re. Therefore, the rate of pyrolysis combustion is increased with increased Re number. Also, because of the increase in combustion rate (heat flux) the temperature in this region will increase. The increased temperature will decrease the drying time. The end result is the ability to fire larger particles and to increase the volume of air to the zone without increasing entrainment levels.

The level of turbulence achievable is subject to practical limitations and the law of diminishing returns exists as the turbulence increases pyrolytic combustion. These constraints will control the available capacity increase from this approach.

The supply of air to the char bed may be increased until the level of entrainment exceeds the acceptable limit or localized cooling of the bed occurs.

In practicing the present invention, oxygen is injected into the primary air furnished to the recovery boiler. As a consequence:

the combustion rate of the residual char increases;
the temperature in the lower furnace increases;
heat transfer to the falling liquor droplets increases;
heat transfer to the water conveying tubes increases;
drying time decreases;
time available for pyrolysis increases;
carbon concentration in the char bed diminishes;
the temperature of the glass entering the upper heat transfer surfaces decreases;
size of the black liquor particle and the total mass of the particle is increased until the carbon concentation of the char particle reaching the char bed rises to a level which matches the carbon consumption rate of the char bed;
the rate of particle entrainment is decreased;
the rate of deposit formation is reduced;
since the deposition rate is reduced, the total mass flow rate of black liquor and combustion air can be increased until the rate of deposit formation is equivalent to the original deposition rate.

The process continues until the level of entrainment due to increased secondary air is equivalent to the orginal entrainment level.

Referring to FIG. 1, it will be seen that FIG. 1 is a schematic drawing of a conventional boiler for recovering heat from the combustion of black liquor. The black liquor is sprayed into the boiler approximately 15-20 feet above the floor or grate. Primary air is blown at the carbon residue that lands on the grate and secondary air is blown into the zone directly above the grate. Under steady state conditions, the black liquor droplets will dry, pyrolyse and finally become a porous carbon residue (char) which falls toward the grate. The pyrolysis products and the char will react (burn) when they contact the secondary and/or primary air if the temperature in the lower furnace is high enough. The rate at which these reactions occur is a function of temperature and oxygen concentration. The energy which is released radiates to the furnace walls which are lined with refractory or with tubes conveying water. The water is converted to steam in the upper regions of the furnace and is used in subsequent processes.

As shown in FIG. 1, black liquor is discharged into a furnace in a region above the zone in which combustion takes place. There the water in the black liquor is evaporated, preparatory to the combustion of the black liquor. The droplets then descend into a zone where the black liquor is pyrolyzed. The products of pyrolysis are combusted and the char which remains after pyrolysis of the black liquor falls on the smelt bed and is combusted and thus completes the steps which occur in the combustion of the black liquor.

Figure 2:
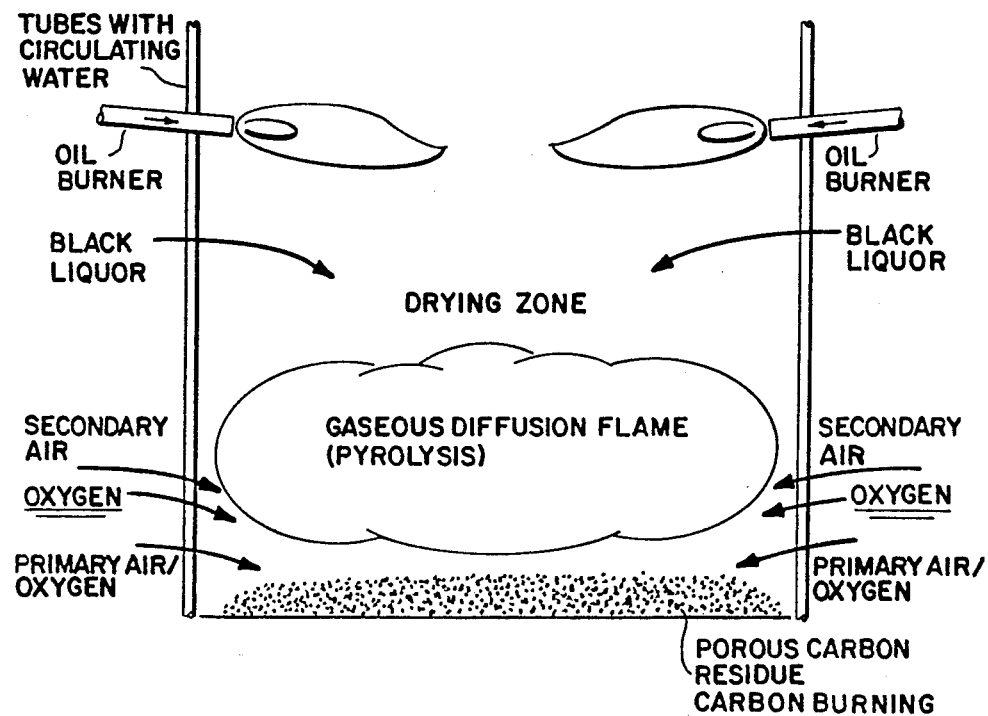
FIG. 2 is a schematic representation of the same furnace modified in accordance with the present invention.

The present invention seeks to increase the char burning rate, the drying rate, pyrolysis rate and the heat transfer rate to the tubes conveying water in the lower furnace. As shown schematically in FIG. 2 this is accomplished by the addition of oxygen to the prior art system shown in FIG. 1. The specific additions are (1) to the primary air utilized for the burning of the carbonaceous residue (char) present after heating, drying and pyrolysis of the black liquor and after combustion of the volatiles evolved from the black liquor and (2) to the secondary air, supplied to the region above the porous char residue. Also, the present invention seeks to increase the oxygen concentration in the zone of combustion and thereby increase both the rate of pyrolytic combustion and the rate of combustion of the solid carbonaceous residue.

Similar improvements result from oxygen enrichment of the secondary air and from oxygen enrichment of both the primary and the secondary air.

The times required for each of the processes (i.e. drying, pyrolysis and char burning) are primarily controlled by turbulence, temperature and oxygen concentration.

The drying rate is subject to the following functions:
Drying Rate $$\frac{\lambda}{C_p N_s} \text{Ln} \frac{(1+B)}{B} (1 + 0.39 \, Pr^{\frac{1}{2}} \, Re^{\frac{1}{2}})$$

where
Ds=mass diffusivity coefficient
Ns=radius of particle
λ=thermal conductivity of gases
Pr=Prandl number=1.0
Re=Reynolds number
B=Cp(Too−Ts)/Lv
Cp=specific heat of gases
where
Too=temperature of surrounding gases
Ts=surface temperature
Lv=heat of vapourization
and the function:
Drying rate $$\alpha F_{1-2} E_1 [T_2^4 - T_1^4]$$

where
$F_{1-2}E_2$ accounts for emissivity of system, gas characteristics and enclosure (furnace characteristics)
T2=combustion gas temperature
T1=droplet surface temperature The actual drying rate will be determined by the relative importance of these functions. When oxygen enrichment is employed and increases the combustion gas temperature, the first equation will be increased logarithmically and the second equation will be increased by the fourth power.

For pyrolysis, similar equations apply execpt that Lv is equal to energy required for pyrolysis and B is defined as:

$$B = \frac{C_p (T_{oo} - T_s) + i \, m_o \, H}{L_v}$$

where
i=stoichiometric coefficient
mo=concentration of oxygen in surrounding environment
H=heat of reaction
and the influence of i mo H predominates over Cp(Too−Ts)

The rate of char burning can be estimated by the equation:

$$\text{Char burning } \alpha \, H_D \, [O_2]$$

where
$H_D$=convective mass transfer coefficient which is related to temperature and turbulence (i.e. Reynolds number)
$[O_2]$=oxygen concentration Adding oxygen to the primary air stream will increase the rate of char burning on a linear basis as a minimum.

The following represents a chemical balance for the combustion of one (1) lb of incremental dry liquor solids, when the process invention is employed.

FIG. #2 - CHEMICAL BALANCE FOR COMBUSTION OF 1 lb DRY LIQUOR SOLIDS WITH OXYGEN ENRICHMENT

| Dry Air | = | 1.81 | | Dry Flue Gas | = | 2.68 |
|---|---|---|---|---|---|---|
| $N_2$ | = | 1.39 | COM- | $CO_2$ | = | 1.29 |
| $O_2$ | = | 0.42 (Air) | BUS- | $N_2$ | = | 1.39 |
| $H_2O$ | = | 0.027 | TION | $O_2$ | = | 0 |
| $O_2$ | = | 0.63 | | $H_2O$ | = | 0.916 |
| Liquor | | | | Smelt | | |
| Na | = | 0.187 | | $Na_2S$ | = | 0.075 |
| S | = | 0.034 | • | $Na_2SO_4$ | = | 0.015 |
| C | = | 0.388 | | $Na_2CO_3$ | = | 0.318 |
| H | = | 0.039 | | | | |
| O | = | 0.352 | | | | |
| $H_2O$ | = | 0.538 | | | | |

Note:
60% of the additional oxygen is provided by elemental $O_2$.
40% of the additional oxygen is provided by secondary Air.

TABLE #2

HEAT BALANCE WITH OXYGEN ENRICHMENT

| Inputs | Btu/lb Solids |
|---|---|
| Heating value black liquor | 6,600 |
| Sensible heat of black liquor | 150 |
| Total: | 6,750 |
| Outputs | |
| Sensible heat of dry flue gas | 277 |
| Sensible heat of moisture in flue gas | 128 |
| Latent heat of water in black liquor | 555 |
| Latent heat of water from combustion | 360 |
| Heat content of smelt | 230 |
| Heat to form sulphide | 420 |
| Radiation losses | 0 |
| Total: | 1,970 |
| Heat to steam | 4,780 |

I claim:

1. In the combustion of black liquor in an existing Tomlison recovery boiler unit in which black liquor is sprayed into a furnace in which it is successively dried, pyrolyzed and converted to a bed of solid carbonaceous residue, using a primary air stream and a secondary air stream and said residue is subsequently converted to a smelt, the improvement which comprises:

the addition of between an effective amount up to 5% oxygen by volume to the primary air stream directed at said bed of solid carbonaceous residue, the amount of oxygen added being sufficient to increase the adiabatic flame temperature, the combustion rate of the solid carbonaceous material, the rate of pyrolysis, the temperature in the lower portion of the furnace, and the drying rate of black liquor droplets, and to decrease the temperature of the gases entering the heat transfer surfaces in the upper portion of the furnace and the rate of deposit formation on said surfaces and wherein the amount of black liquor combusted is increased as compared with the amount combusted in the same furnace operated without the addition of oxygen to the primary air.

2. The invention in claim 1 wherein an effective amount of oxygen up to 5% oxygen is also added to the secondary air introduced above the bed of carbonaceous material, a sufficient amount of oxygen being added to produce the effects set forth in claim 1.

* * * * *